United States Patent
Yeh

(12) 
(10) Patent No.: US 6,220,369 B1
(45) Date of Patent: Apr. 24, 2001

(54) SCRAP REMOVING AND TOOL COOLING DEVICE FOR A FRONT HOLDING END OF A TOOL SPINDLE OF A MACHINE TOOL

(76) Inventor: Hey Yeh, No. 246, Sec. 2, Chang-Hsin Rd., Ho-Mei Chen, Chang-Hua Hsien (TW)

(*) Notice: Subject to any disclaimer, the term of this patent is extended or adjusted under 35 U.S.C. 154(b) by 0 days.

(21) Appl. No.: 09/665,918

(22) Filed: Sep. 20, 2000

(51) Int. Cl.$^7$ .................................................. B27B 17/00
(52) U.S. Cl. ........................ 173/197; 173/199; 173/213; 408/56
(58) Field of Search .................... 173/197, 199, 173/DIG. 2, 213, 73; 408/56, 57, 59, 61

(56) References Cited

U.S. PATENT DOCUMENTS

| | | | |
|---|---|---|---|
| 3,608,648 | * 9/1971 | Dibble, Jr. ............................ | 173/199 |
| 4,034,816 | * 7/1977 | Lutich et al. ................... | 173/DIG. 2 |
| 4,293,251 | * 10/1981 | Anderson .............................. | 173/199 |
| 4,387,775 | * 6/1983 | Adolfsson et al. ............. | 173/DIG. 2 |
| 4,487,271 | * 12/1984 | Pomeroy et al. .................... | 173/197 |
| 4,520,879 | * 6/1985 | MacElvain ............................. | 173/73 |
| 4,624,339 | * 11/1986 | Marcel et al. .................. | 173/DIG. 2 |

* cited by examiner

Primary Examiner—Scott A. Smith
(74) Attorney, Agent, or Firm—Wells, St. John, Roberts, Gregory & Matkin

(57) ABSTRACT

A scrap removing and tool cooling device includes a cooling air conduit adapted to be disposed in a housing of a machine tool and extending in an axial direction parallel to a tool spindle of the machine tool. The cooling air conduit includes an inlet formed in the housing for introducing cooling air therein, and an outlet passing through a front end wall of the housing. A hood member includes a rear surrounding wall engaging the front end wall of the housing and extending to surround and be spaced apart from a front holding end of the tool spindle with a first distance so as to cooperate with the front end wall to define a chamber to communicate with the outlet, and a front surrounding wall extending forwardly from the rear surrounding wall and surrounding and spaced apart from the front holding end with a second distance smaller than the first distance so as to cooperate with the front holding end to define a blowing outlet to communicate with the chamber. During the operating process, cooling air can be introduced into the cooling air conduit from the inlet, and flows towards the chamber for eventual discharge via the blowing outlet, thereby cooling a tool insert mounted on the front holding end, and thereby blowing off scrap on the front holding end and the tool insert.

1 Claim, 4 Drawing Sheets

SCRAP REMOVING AND TOOL COOLING DEVICE FOR A FRONT HOLDING END OF A TOOL SPINDLE OF A MACHINE TOOL

BACKGROUND OF THE INVENTION

1. Field of the Invention

This invention relates to a tool spindle of a machine tool, more particularly to a scrap removing and tool cooling device adapted to blow cooling air to the vicinity of a front holding end of a tool spindle so as to blow off scrap and to cool a tool insert held on the front holding end.

2. Description of the Related Art

Referring to FIG. 1, a conventional holding device for a machine tool is shown to include a housing 1, and a tool spindle 2 which is rotatably mounted in the housing 1 and which has a front holding end 3 that protrudes outwardly of the housing 1 for holding a tool insert 4.

When the tool insert 4 rotates at a high speed during the operating process, scrap is usually produced and accumulates on the tool insert 4 and the front holding end 3. This condition is aggregated when cooling liquid is used to cool the tool insert 4.

SUMMARY OF THE INVENTION

The object of the present invention is to provide a scrap removing and tool cooling device which is adapted to blow cooling air to the vicinity of the front holding end of the tool spindle of the machine tool so as to blow off scrap and to cool a tool insert held on the front holding end.

According to this invention, the scrap removing and tool cooling device includes a cooling air conduit which is adapted to be disposed in a housing of a machine tool and which extends in an axial direction parallel to a tool spindle of the machine tool. The cooling air conduit includes an inlet which is adapted to be formed in a surrounding wall of the housing for introducing cooling air therein, and an outlet which is adapted to pass through a front end wall of the housing. A hood member includes a rear surrounding wall which is adapted to engage the front end wall of the housing and which extends to surround and be spaced apart from a front holding end of the tool spindle with a first distance in a direction radial to the axial direction so as to cooperate with the front end wall to define a chamber to communicate with the outlet, and a front surrounding wall which extends forwardly from the rear surrounding wall and which is adapted to surround and be spaced apart from the front holding end with a second distance in the radial direction and smaller than the first distance so as to cooperate with the front holding end to define a blowing outlet to communicate with the chamber. As such, during the operating process, cooling air can be introduced into the cooling air conduit from the inlet, and flows towards the chamber via the outlet for eventual discharge at the blowing outlet, thereby cooling a tool insert mounted on the front holding end, and thereby blowing off scrap on the front holding end and the tool insert.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
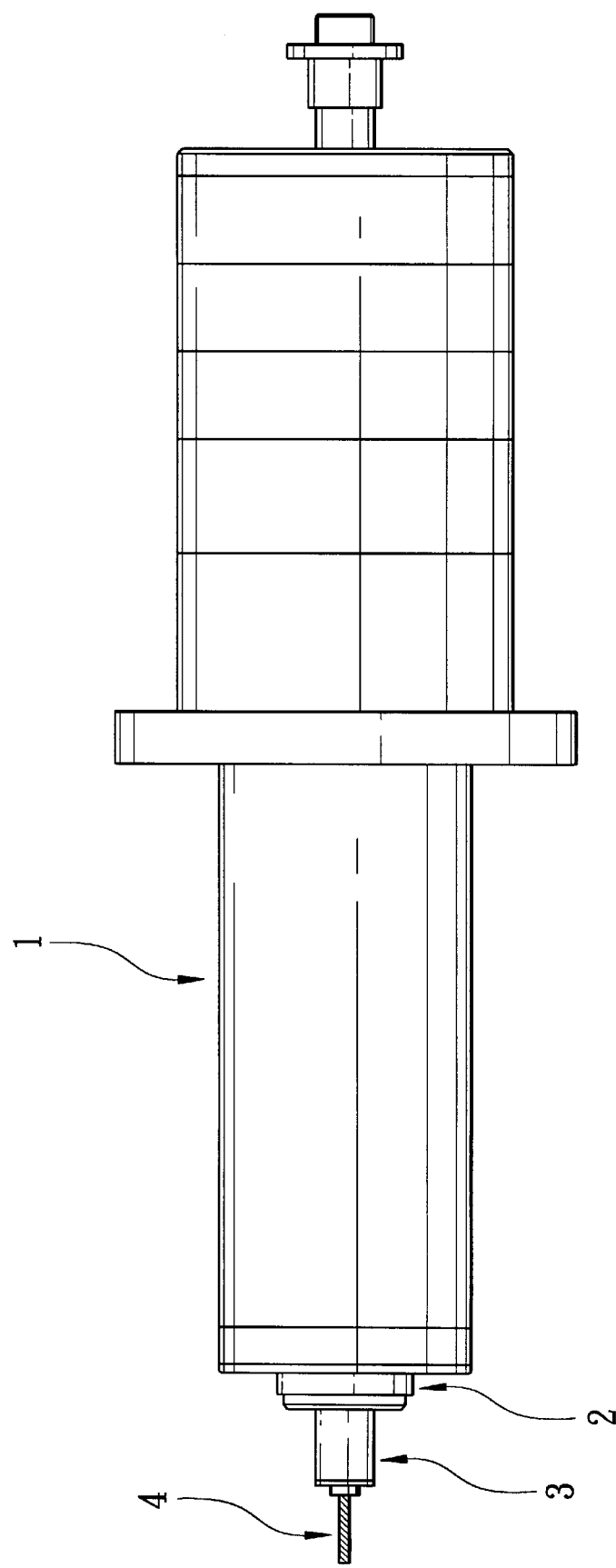
FIG. 1 is a schematic view of a conventional holding device of a machine tool.
Figure 2:
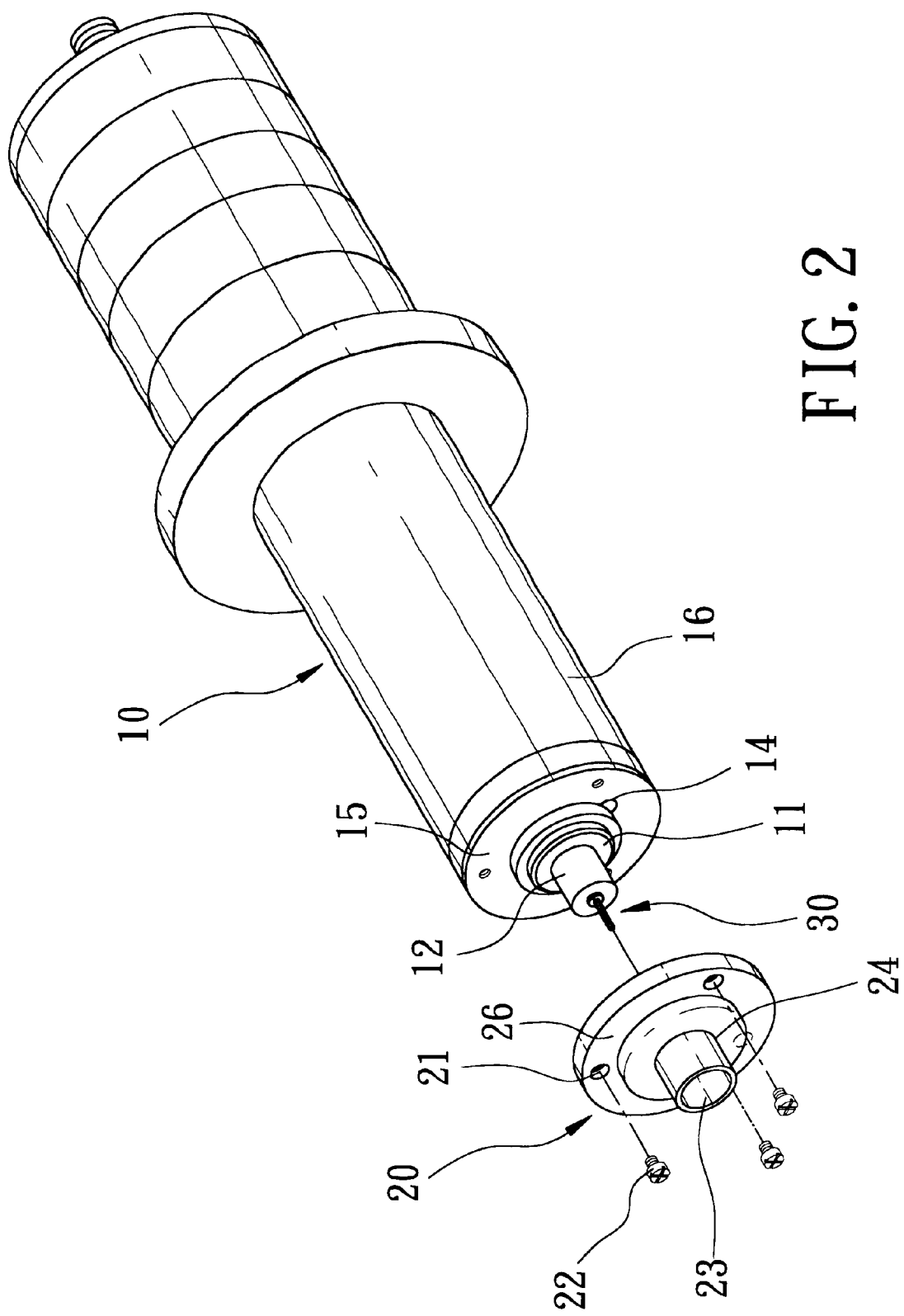
FIG. 2 is an exploded perspective view of a preferred embodiment of a scrap removing and tool cooling device according to this invention.
Figure 3:
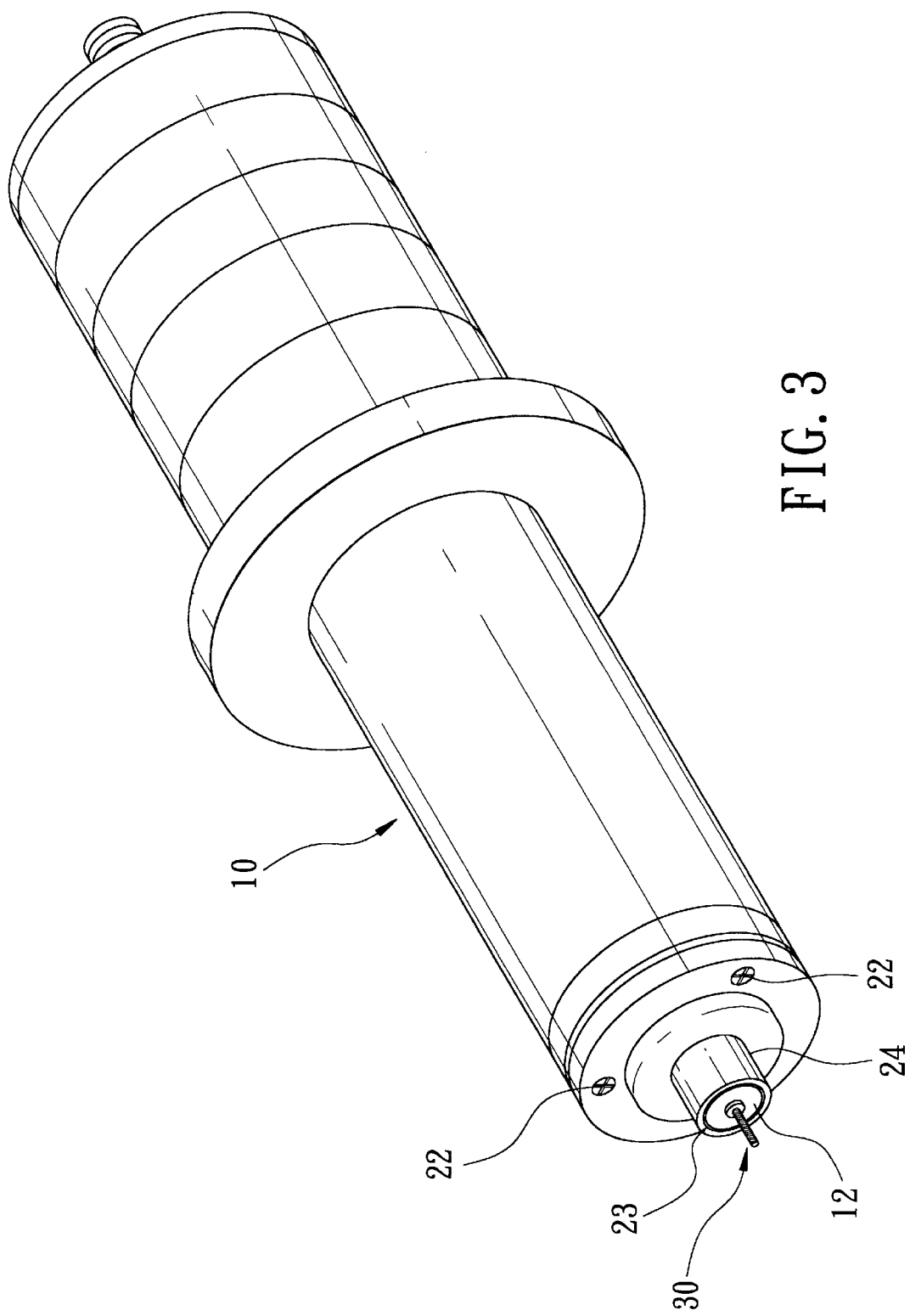
FIG. 3 is a perspective view of the preferred embodiment.
Figure 4:
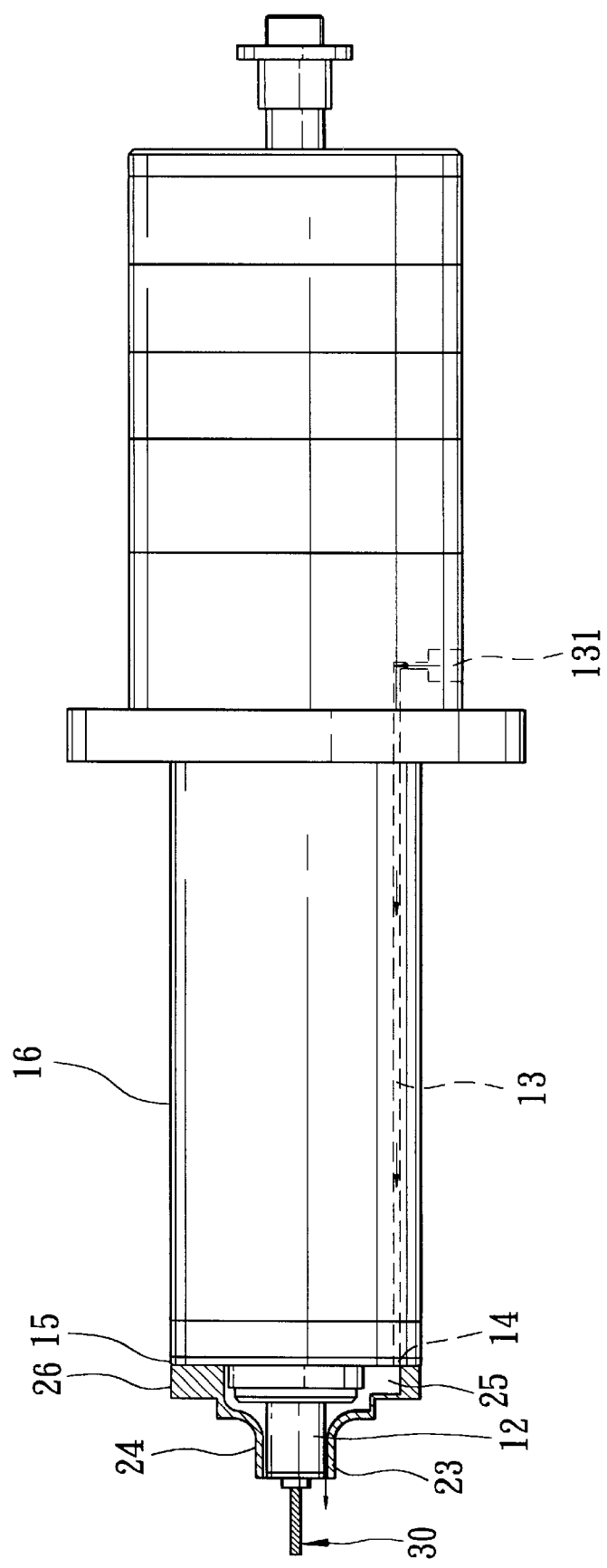
FIG. 4 is a partly sectional schematic view of the preferred embodiment.

Referring to FIGS. 2, 3 and 4, the preferred embodiment of the scrap removing and tool cooling device according to the present invention is shown to be disposed on a front holding end 12 of a tool spindle 11 of a machine tool. The machine tool has a housing 10 which includes a front end wall 15 that is disposed for passage of the front holding end 12 of the tool spindle 11, and a surrounding wall 16 that extends rearwardly from a periphery of the front end wall 15 to surround the tool spindle 11. The tool spindle 11 extends in an axial direction and has the front holding end 12 thereof protruding outwardly of the front end wall 15 for holding a tool insert 30.

The scrap removing and tool cooling device comprises a cooling air conduit 13 which is disposed in the housing 10 and which extends in the axial direction. The cooling air conduit 13 includes an inlet 131 which is formed in the surrounding wall 16 of the housing 10 and which is connected to an air supply (not shown) for introducing cooling air therein, and an outlet 14 which passes through the front end wall 15 of the housing 10.

A hood member 20 includes a rear surrounding wall 26 which engages the front end wall 15 of the housing 10 by means of screw fasteners 22 that pass through holes 21 in the rear surrounding wall 26 and that engage the front end wall 15. The rear surrounding wall 26 extends to surround and is spaced apart from the front holding end 12 with a first distance in a direction radial to the axial direction so as to cooperate with the front end wall 15 to define a chamber 25 to communicate with the outlet 14. The hood member 20 further includes a front surrounding wall 24 which extends forwardly from the rear surrounding wall 26 and which surrounds and is spaced apart from the front holding end 12 with a second distance in the radial direction and smaller than the first distance so as to cooperate with the front holding end 12 to define a blowing outlet 23 to communicate with the chamber 25.

During the operating process, cooling air can be introduced into the cooling air conduit 13 from the inlet 131, and flows towards the chamber 25 via the outlet 14 for eventual discharge at the blowing outlet 23, thereby blowing off scrap on the tool insert 30 and the front holding end 12 and thereby cooling the tool insert 30.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A scrap removing and tool cooling device adapted to blow cooling air to the vicinity of a front holding end of a tool spindle of a machine tool, the machine tool having a housing that includes a front end wall disposed for passage of the front holding end of the tool spindle and a surrounding wall extending rearwardly from a periphery of the front end wall to surround the tool spindle, the tool spindle extending in an axial direction and having the front holding end thereof protruding outwardly of the front end wall for holding a tool insert, said device comprising:

a cooling air conduit adapted to be disposed in the housing and extending in the axial direction, said cooling air conduit including an inlet adapted to be formed in the surrounding wall of the housing for introducing cooling air therein, and an outlet adapted to pass through the front end wall of the housing; and a hood member including a rear surrounding wall adapted to engage the front end wall of the housing and to extend so as to surround and be spaced apart from the front holding end with a first distance in a direction radial to the axial direction, thereby cooperating with the front end wall to define a chamber to communicate with said outlet, and a front surrounding wall extending forwardly from said rear surrounding wall and adapted to surround and be spaced apart from the front holding end with a second distance in the radial direction and smaller than the first distance, thereby cooperating with the front holding end to define a blowing outlet to communicate with said chamber.

* * * * *